US011627380B2

(12) United States Patent
Li

(10) Patent No.: US 11,627,380 B2
(45) Date of Patent: *Apr. 11, 2023

(54) CATV DEVICE WITH RESISTIVE SIGNAL DISTRIBUTION NETWORK

(71) Applicant: CommScope Technologies LLC, Hickory, NC (US)

(72) Inventor: Shi Man Li, Mooresville, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/390,861

(22) Filed: Jul. 30, 2021

(65) Prior Publication Data

US 2021/0360327 A1 Nov. 18, 2021

Related U.S. Application Data

(63) Continuation of application No. 16/788,283, filed on Feb. 11, 2020, now Pat. No. 11,109,112.

(Continued)

(51) Int. Cl.
*H04N 21/61* (2011.01)
*H04L 12/28* (2006.01)
(Continued)

(52) U.S. Cl.
CPC ..... *H04N 21/6118* (2013.01); *H04L 12/2838* (2013.01); *H04N 7/106* (2013.01); *H04N 7/17309* (2013.01); *H04N 21/6168* (2013.01)

(58) Field of Classification Search
CPC ........... H04N 21/6118; H04N 21/6168; H04N 7/106; H04N 7/17309; H04N 7/104; H04L 12/2838; H04L 12/2801
See application file for complete search history.

(56) References Cited

U.S. PATENT DOCUMENTS 3,676,744 A 7/1972 Pennypacker
4,459,568 A 7/1984 Landt
(Continued)

FOREIGN PATENT DOCUMENTS

GB 2 523 332 A 8/2015

OTHER PUBLICATIONS

ReDeSign, Extending Lifetime of HFC Networks, Deliverable D08, HFC Channel Model, Dec. 2008, DeDeSign—217014.

*Primary Examiner* — Jefferey F Harold
*Assistant Examiner* — Timothy R Newlin
(74) *Attorney, Agent, or Firm* — Muncy, Geissler, Olds & Lowe, P.C.

(57) ABSTRACT

The present invention is directed to a CATV & MoCA® device, such as a RF signal amplifier. The RF signal amplifier includes a RF input port to receive signals from, and transmit signals to, a service provider. The RF input port is connected to an active communication path with a downstream signal amplifier leading to an input of a resistive splitter network. The resistive splitter network has plural interconnected resistors, which split the amplified signal received at the input of the resistive splitter network and provide the signal to plural "CATV & MoCA®" output ports. Upstream CATV signals received by the "CATV & MoCA®" output ports are combined by the resistive splitter network and sent to the RF input port to be transmitted to the service provider. MoCA® signals received by any one of the "CATV & MoCA®" output ports are carried by the resistive splitter network to the other "CATV & MoCA®" output ports, and potentially to other "MoCA® only" ports of the RF signal amplifier.

20 Claims, 8 Drawing Sheets

Related U.S. Application Data

(60) Provisional application No. 62/804,155, filed on Feb. 11, 2019.

(51) Int. Cl.
  *H04N 7/10* (2006.01)
  *H04N 7/173* (2011.01)

(56) References Cited

U.S. PATENT DOCUMENTS

| | | | |
|---|---|---|---|
| 5,675,300 | A | 10/1997 | Romerein |
| 5,689,817 | A | 11/1997 | Fok |
| 5,815,052 | A * | 9/1998 | Nakajima ............ H03H 9/0576 333/175 |
| 6,324,379 | B1 * | 11/2001 | Hadden .................. H04B 1/408 455/84 |
| 6,969,278 | B2 | 11/2005 | Shapson |
| 7,310,355 | B1 | 12/2007 | Krein et al. |
| 7,530,091 | B2 | 5/2009 | Vaughan |
| 7,633,435 | B2 | 12/2009 | Meharry et al. |
| 8,230,470 | B2 | 7/2012 | Robertson et al. |
| 8,397,271 | B2 * | 3/2013 | Riggsby .................. H04B 3/04 725/148 |
| 8,479,247 | B2 | 7/2013 | Shafer |
| 8,561,125 | B2 | 10/2013 | Alkan et al. |
| 8,589,997 | B2 | 11/2013 | Wells |
| 8,695,055 | B2 | 4/2014 | Labro |
| 8,752,114 | B1 * | 6/2014 | Shapson ................ H04H 20/78 725/127 |
| 8,810,334 | B2 | 8/2014 | Rijssemus |
| 9,094,226 | B2 | 7/2015 | Kliger et al. |
| 9,167,286 | B2 | 10/2015 | Wells |
| 9,209,774 | B2 | 12/2015 | Rijssemus |
| 9,356,796 | B2 | 5/2016 | Shapson et al. |
| 9,516,376 | B2 | 12/2016 | Wells et al. |
| 9,699,516 | B2 * | 7/2017 | Li ...................... H04N 7/17309 |
| 9,743,038 | B2 * | 8/2017 | Li ........................... H04N 7/104 |
| 9,795,043 | B2 | 10/2017 | Li et al. |
| 2002/0116720 | A1 * | 8/2002 | Terry .................. H04L 12/2856 370/408 |
| 2004/0068753 | A1 * | 4/2004 | Robertson ............. H04N 7/106 348/E7.086 |
| 2004/0068754 | A1 * | 4/2004 | Russ .................. H04N 21/4263 348/E7.071 |
| 2005/0044573 | A1 | 2/2005 | Preschutti |
| 2006/0205442 | A1 | 9/2006 | Phillips et al. |
| 2008/0120667 | A1 | 5/2008 | Zaltsman |
| 2008/0148325 | A1 | 6/2008 | Robertson et al. |
| 2009/0320086 | A1 | 12/2009 | Rijssemus et al. |
| 2010/0138880 | A1 * | 6/2010 | Reed ...................... H04N 7/104 725/78 |
| 2010/0194492 | A1 | 8/2010 | Rijssemus ................ H03H 7/48 333/131 |
| 2011/0002245 | A1 * | 1/2011 | Wall .................... H04M 7/1215 370/328 |
| 2011/0085089 | A1 | 4/2011 | Jung |
| 2011/0181371 | A1 * | 7/2011 | Alkan ................. H04L 12/2838 333/132 |
| 2012/0054805 | A1 * | 3/2012 | Shafer ................. H04L 12/2801 725/78 |
| 2012/0081190 | A1 * | 4/2012 | Rijssemus .............. H04N 7/104 333/25 |
| 2013/0002958 | A1 * | 1/2013 | Labro ..................... H04N 7/104 348/584 |
| 2013/0081096 | A1 * | 3/2013 | Wells ..................... H04N 7/102 725/120 |
| 2013/0091533 | A1 | 4/2013 | Wells et al. |
| 2013/0181789 | A1 | 7/2013 | Rijssemus |
| 2013/0227632 | A1 | 8/2013 | Wells et al. |
| 2015/0026750 | A1 * | 1/2015 | Wachob ................... H04N 7/22 725/127 |
| 2015/0304732 | A1 * | 10/2015 | Shapson ............ H04N 21/6118 725/149 |
| 2018/0007313 | A1 * | 1/2018 | Bailey ...................... H04B 3/38 |
| 2018/0007318 | A1 * | 1/2018 | Bailey .................... H04H 20/78 |
| 2018/0007425 | A1 * | 1/2018 | Bailey ................. H04N 21/615 |
| 2018/0205910 | A1 * | 7/2018 | Li .......................... H03H 7/482 |
| 2018/0288463 | A1 | 10/2018 | Shapson et al. |
| 2018/0288491 | A1 * | 10/2018 | Shapson ................ H04N 7/102 |
| 2019/0074904 | A1 * | 3/2019 | Lin ........................... H04L 5/02 |
| 2019/0110021 | A1 * | 4/2019 | Bailey ...................... H03F 3/62 |
| 2019/0221974 | A1 * | 7/2019 | Bailey ................... H04N 7/104 |
| 2019/0230399 | A1 * | 7/2019 | Bailey ................ H04N 21/4112 |

* cited by examiner

CATV DEVICE WITH RESISTIVE SIGNAL DISTRIBUTION NETWORK

This application is a continuation of application Ser. No. 16/788,283, filed Feb. 11, 2020, which claims the benefit of U.S. Provisional Application Ser. No. 62/804,155, filed Feb. 11, 2019, both of which are herein incorporated by reference.

BACKGROUND OF THE INVENTION

1. Field of the Invention

The present invention generally relates to radio frequency ("RF") signal amplifiers and, more particularly, to signal amplifiers that support Multimedia Over Coax Alliance ("MoCA®") communications. The present invention provides a RF signal amplifier within an active communication path leading to plural amplified output ports supported by a resistive splitter network.

2. Description of the Related Art

Cable television ("CATV") networks are known types of communications networks that are used to transmit information between a service provider and a plurality of subscriber premises, typically over fiber optic and/or coaxial cables. The service provider may offer, among other things, cable television, broadband Internet and Voice-over-Internet Protocol ("VoIP") digital telephone service to subscribers within a particular geographic area. The service provider transmits "forward path" or "downstream" signals from the headend facilities of the cable television network to the subscriber premises. "Reverse path" or "upstream" signals may also be transmitted from the individual subscriber premises back to the headend facilities. In the United States, the forward path signals are typically transmitted in the 54-1,002 MHz frequency band, and may include, for example, different tiers of cable television channels, movies on demand, digital telephone and/or Internet service, and other broadcast or point-to-point offerings. The reverse path signals are typically transmitted in the 5-42 MHz frequency band and may include, for example, signals associated with digital telephone and/or Internet service and ordering commands, i.e., for movies-on-demand and other services.

Each subscriber premises typically includes one or more power divider networks that are used to divide the downstream signals received from the service provider, so that the downstream signals may be fed to a plurality of service ports, such as wall outlets that are dispersed throughout the subscriber premises. These power divider networks also combine upstream signals that may be transmitted from one or more of the service ports into a composite upstream signal that is transmitted over the CATV network back to the headend facilities, e.g., in the 5-42 MHz frequency band.

A recent trend is to use the coaxial cables that are installed throughout most homes, apartments and other subscriber premises as an "in-premises" or "in-home" network that may be used to transmit signals from a first end device that is connected to a first wall outlet in a subscriber premises to other end devices that are connected to other wall outlets in the same subscriber premises. An industry alliance known as the Multi-media Over Coax Alliance ("MoCA®") has developed standards which specify frequency bands, interfaces and other parameters that will allow equipment from different standards-compliant vendors to be used to distribute multi-media content over such in-premises coaxial cable networks. These standards specify that such "MoCA®" content is transmitted over the in-premises coaxial cable networks in the 850 MHz to 1675 MHz frequency band, although some service providers only distribute MoCA® content within a narrower frequency band that is above the cable television band, such as, for example, the 1,125 MHz to 1,675 MHz frequency band. Thus, the MoCA® content is transmitted over the in-premises network in a pre-selected MoCA® frequency band. The power divider network in the in-premises network may be designed to support communications between its output ports in this pre-selected MoCA® frequency band.

Examples of MoCA® content that may be distributed over an in-premises coaxial cable network are digital television, video-on-demand programming and digitally-recorded television or music programming. In an exemplary application, such programming may be transmitted via the in-premises network of a home from a primary set-top box (which may be a full service set top box having a digital television receiver, DVR and/or video-on-demand capabilities, etc.) to less capable, less expensive, auxiliary set-top boxes that are installed on other televisions throughout the premises or directly to televisions, DVD players, etc. with MoCA® ports. In this manner, the full capabilities of the primary set top box may be enjoyed at all of the televisions within the residence without having to provide a primary set top box for each television.

In many cases, significant attenuation may occur as signals are passed through the cable television network of a service provider, and hence the power level of the RF signal that is received at a subscriber premises may be on the order of 0-5 dBmV/channel. Such received signal levels may be insufficient to support the various services at an acceptable quality of service level. Accordingly, an RF signal amplifier may be provided at or near an entrance point of an individual subscriber's premises. The RF signal amplifier is used to amplify the downstream RF signals to a more useful level. The RF signal amplifier may also be configured to amplify the upstream RF signals that are transmitted from the subscriber premises to the headend facilities of the cable television network. Typically, the RF signal amplifiers are incorporated into the power divider network as the first unit, which takes the form of a powered bi-directional RF signal amplifier with an input port for receiving a coaxial cable from the service provider side and plural output ports which receive coaxial cables connected to the various service ports, such as the wall outlets that are dispersed throughout the subscriber's premises.

In accordance with the known power divider network unit, a RF signal amplifier receives a composite downstream RF signal of approximately 5 dBmV/channel in the range of approximately 54-1,002 MHz comprising information for telephone, cable television (CATV), Internet, VoIP, and/or data communications from a service provider. The RF signal amplifier may increase this downstream signal to a more useful level of approximately 20 dBmV/channel at each output port of the unit and pass the amplified downstream signal to one or more devices in communication with the RF signal amplifier through connections to the various coaxial wall outlets. Such devices may include, but need not be limited to: televisions, modems, telephones, computers, and/or other communications devices known in the art. In the event of power failure, unamplified signals may still be passed (in both directions) through a passive communications path between the service provider and at least one communications device.

FIG. 1 illustrates a block diagram of a bi-directional RF signal amplifier 100 according to the background art. FIG. 2 is perspective view of the outer housing 101 of the bi-directional RF signal amplifier 100. More information concerning the bi-directional RF signal amplifier 100 can be found in the Assignee's U.S. Pat. No. 9,699,516, granted Jul. 4, 2017, the entire contents of which are herein incorporated by reference.

The RF signal amplifier 100 includes a plurality of RF output ports 211, 213, 215, 217, 219, 221, 223 and 225 that may be used to pass downstream and upstream signals between a service provider and multiple communications devices located in the subscriber premises when the RF signal amplifier is powered and operating normally. Moreover, the RF signal amplifier 100 further includes a non-interruptible RF output port 189 that may be used to maintain bi-directional RF communications even during power outages.

As shown in FIG. 1, RF signal amplifier 100 includes a bi-directional RF input port 105 for receiving downstream RF signals from a service provider, or any other appropriate signal source. The RF input port 105 can also pass upstream signals in the reverse direction from the RF signal amplifier 100 to the service provider. Due to the bi-directional nature of communications through RF signal amplifiers, it will be appreciated that an "input" port will act as an "output" port and an "output" port will act as an "input" port if the direction of signal flow is reversed. Consequently, it will be appreciated that the terms "input" and "output" are used herein solely for purposes of distinguishing various ports from one another, and are not used to require a direction of signal flow.

As noted above, RF signal amplifier 100 further includes a plurality of bi-directional output ports 211, 213, 215, 217, 219, 221, 223, 225 and 189 that may be used to pass downstream RF signals from the RF signal amplifier 100 to one or more devices in communication with the output ports 211, 213, 215, 217, 219, 221, 223, 225 and 189, and to receive upstream RF signals from those devices so that they may be passed through the RF signal amplifier 100 to the service provider. It will be appreciated that any appropriate device that may advantageously send and/or receive an RF signal may be placed in communication with one or more of the various output ports 211, 213, 215, 217, 219, 221, 223, 225 and 189. For example, it is contemplated that telephone, CATV, Internet, VoIP, and/or data communication devices may be placed in such communication with a service provider where the RF signal amplifier 100 is installed in the residence of a subscriber. However, it will further be appreciated that any desired combination of these and/or other devices may be used where appropriate.

Signals received through RF input port 105 can be passed through RF signal amplifier 100 via an active communications path 114 that extends between RF input port 105 and RF output ports 211, 213, 215, 217, 219, 221, 223 and 225. Specifically, the downstream signals that are received at RF input port 105 from the service provider are passed to a passive directional coupler 110 that has a first output port that connects to the active communications path 114 and a second output port that connects to a passive communications path 118. The directional coupler 120 splits downstream RF signals onto the active communications path 114 and the passive communications path 118. It will be appreciated that the directional coupler 120 may either evenly or unevenly split the power of the downstream signals between the communications paths 114, 118, depending on the design of the overall circuit. The active communications path 114 amplifies at least one of downstream signals from the service provider to the subscriber premises or upstream signals from the subscriber premises to the service provider. The passive communications path 118 acts as a "non-interruptible" communications path that has no active components thereon, which allows downstream and/or upstream signals to traverse the passive communications path 118 even if a power supply to the RF signal amplifier 100 is interrupted. In some embodiments, the passive communications path 118 may provide a communications path for VoIP telephone service that will operate even during power outages at the subscriber premises (assuming that the modem and/or telephone, as necessary, are powered by a battery backup unit).

As is further shown in FIG. 1, downstream signals traversing the active communications path 114 pass from the first output of directional coupler 110 to an input port of a switching device such as, for example, an SPDT non-latching relay 120. A first output 122 of the relay 120 is connected to an input of a first high/low diplexer 130. A second output 124 of the relay 120 is connected to a resistor 126, such as a 75 ohm resistor connected between the second output 124 and ground.

The first high/low diplexer 130 separates the high frequency downstream signal from any low frequency upstream signals incident in the reverse direction. In various embodiments, the first high/low diplexer 130 can filter the signals in a manner such that signals with frequencies greater than approximately 45-50 MHz are passed as high frequency, downstream signals, while signals with frequencies lower than such range are passed in the reverse direction as low frequency, upstream signals received from ports 211, 213, 215, 217, 219, 221, 223 and 225. It will be appreciated, however, that other diplexer designs may be utilized.

The high frequency downstream signals filtered by the first high/low diplexer 130 can be amplified by individual power amplifier 140, and passed through a second high/low diplexer 150 to a MoCA® rejection filter 160. MoCA® rejection filter 160 attenuates any frequencies in the MoCA® frequency range. Typically, no signals in the downstream direction will contain MoCA® frequencies and hence the downstream signal will be unaffected.

Next, the downstream signal passes to an input 169 of a power divider network 170. The power divider network 170 splits the downstream signal so that it may be distributed to each of ports 211, 213, 215, 217, 219, 221, 223 and 225. In the embodiment of FIG. 1, the power divider network 170 includes a power divider 171 in a first tier, feeding power dividers 172 and 173 in a second tier, feeding power dividers 174, 175, 176 and 177 in a third tier. The first, second and third tiers form a pyramid structure. While the power divider network 170 illustrated in FIG. 1 splits the downstream signals for distribution to eight different ports, it will be appreciated that the power divider network 170 may split the downstream signals for distribution to different numbers of ports (e.g., four, six, ten, etc.). The power dividers 171, 172, 173, 174, 175, 176 and 177 are typically devices employing a ferrite core to split an incoming signal at an input leg to two output legs, and using the ferrite core to combine signals received at the two output legs and send the combined signal to the input leg.

Turning now to the reverse (upstream) signal flow through the active communications path 114 of RF signal amplifier 100, upstream signals received by the RF signal amplifier 100 from devices in communication with ports 211, 213, 215, 217, 219, 221, 223 and 225 are passed to power divider network 170 where they are combined into a composite upstream signal. This composite upstream signal is fed out of input 169 through the MoCA® rejection filter 160. The MoCA® rejection filter 160 attenuates frequencies in the MoCA® frequency range so as to prevent the MoCA® signaling, which freely traverses between the ports 211, 213, 215, 217, 219, 221, 223 and 225, from entering the second high/low diplexer 150. The second high/low diplexer 150 separates the low frequency composite upstream signal from any high frequency downstream signals incident in the forward direction. As previously discussed in relation to first high/low diplexer 130, the second high/low diplexer 150 can filter the signals such that signals with frequencies greater than approximately 45-50 MHz are passed in the forward direction as high frequency downstream signals, while signals with frequencies lower than such range are passed in the reverse direction as low frequency upstream signals received from ports 181-188.

The composite low frequency upstream signal filtered by the second high/low diplexer 150 can be passed directly to the first high/low diplexer 130 (or optionally the upstream signal filtered by the second high/low diplexer 150 can pass through an upstream power amplifier 142 prior to reaching the first high/low diplexer 130), where it is then passed through the first output port 122 of the non-latching SPDT relay 120 to the first output port of the directional coupler 110. The directional coupler 110 combines the upstream signal received at output port 122 with any upstream signal received from the passive communications path 118 and passes this combined signal to the RF input port 105 for output to a service provider or other entity in communication with RF input port 105.

The power amplifiers 140 and 142 that are included on the active communications path 114 are active devices that must be powered via a power source, such as a DC linear regulator 195 that outputs a power supply voltage VCC. During normal operation, the RF signal amplifier 100 can be powered from a power input port 190 and/or power that is reverse fed through one of the RF output ports (e.g., output port 188, which is labeled "VDC IN"). In a typical installation at a subscriber premises, it is contemplated that RF signal amplifier 100 may be powered by an AC/DC adapter receiving power provided by the residence (for example, 100-230 VAC, 50/60 Hz). As illustrated in FIG. 1, the power received from either power input 190 or power input 188 may be provided to the DC voltage regulator 195 which supplies an operating voltage VCC to the power amplifiers 140 and 142.

In the event that power to the DC voltage regulator 195 is interrupted, DC voltage regulator 195 will be unable to provide operating voltage VCC to power amplifiers 140 and 142. Consequently, during power outages, the downstream portion (and also the upstream portion, if the upstream power amplifier 142 is employed) of the active communications path 114 will be lost.

As noted above, RF signal amplifier 100 also has the passive communications path 118 that extends from the second output of the directional coupler 120 to the non-interruptible RF output port 189. This passive communication path 118 bypasses the power amplifiers 140 and 142 and does not include any active components. Consequently, the passive communications path 118 will remain available to pass communications between the RF input port 105 and the non-interruptible RF output port 189, even when the power supply to the RF signal amplifier 100 is interrupted. Accordingly, the passive communications path 118 is also referred to as a "non-interruptible" communications path. The passive communications path 118 may be used to maintain essential services to the subscriber premises such as, for example, 911 emergency lifeline services, even during power outages, so long as the subscriber has a battery backup for the necessary devices connected to the non-interruptible RF output port 189.

The passive communications path 118 is connected to the active communications path 114 at the input 169 of the power divider network 170. Within the passive communication path 118, upstream signals from the non-interruptible RF output port 189 pass into an input 168 of a diplexer 162. Signals in the MoCA® frequency range exit the diplexer 162 via output 164 and pass to the active communication path directly upstream of the power divider network 170. By this arrangement, MoCA® signals from the non-interruptible RF output port 189 may enter the input 169 of the power divider network 170. Hence, MoCA® signals may be passed between all of the devices connected to ports 211, 213, 215, 217, 219, 221, 223, 225 and 189.

The signals from the non-interruptible RF output port 189 which pass into the input 168 of a diplexer 162, which are in the high/low frequency range for downstream and upstream communication with the service provider exit the diplexer 162 via output 166 and pass to the second output of the directional coupler 110, where the signals are combined with the signals on the active communication path 114 and are then passed to the RF input port 105.

Additional background art can be found in U.S. Pat. Nos. 3,676,744; 6,969,278; 7,310,355; 7,530,091; 8,230,470, 8,695,055; 8,752,114; 8,810,334; 9,167,286; 9,209,774; 9,356,796; 9,516,376 and 9,743,038, and in US Published Application Nos. 2005/0044573; 2006/0205442; 2008/0120667; 2009/0320086 and 2013/0081096, which are herein incorporated by reference.

SUMMARY OF THE INVENTION

The Applicant has appreciated some drawbacks in the RF signal amplifier 100 of FIG. 1. One drawback is that the power dividers 171-177 are relatively expensive passive devices. Each power divider 171-177 has more or more ferrite cores which are wrapped with wiring, sometimes hand wrapped. The ferrite cores are used to split an incoming signal on an input leg and provide output signals on two output legs. The ferrite cores are also used to combine incoming signals on the output legs to create a combined signal to provide to the input leg. Ferrite cores are ceramic compounds of the transition metals with oxygen, which are ferromagnetic but not conductive. As a passive component, these elements are relatively expense and also take up significant area on the printed circuit board.

The Applicant has appreciated a replacement for the ferrite-based power dividers, which replacement has many advantages and, on balance, leads to an improved RF signal amplifier. The Applicant has configured a resistive splitter network for the active output ports of the RF signal amplifier. The resistors have numerous advantages over the ferrite core power dividers, and limited disadvantages.

Resistors are highly consistent in production, e.g., close to a 1% tolerance in resistance values. Ferrite cores are often hand wound and a material composition variation may exist in the ferrite materials forming the core. As such, ferrite-based power dividers are relatively more inconsistent in electrical performance. Inconsistent components can cause inconsistent performance in the RF signal amplifier, and can also cause more design balancing in the other component parts of the RF signal amplifier. For example, the first and second diplexers 130 and 150 must be tuned to the proper dividing frequencies, and are influenced by the interconnected components within the RF signal amplifier.

Resistors are much cheaper than ferrite-based power dividers. Since the RF signal amplifier of FIG. 1 includes seven power dividers, the cost saving could exceed one dollar per unit.

Resistors have no magnetic properties. Ferrite-based power dividers utilize magnetic fields caused by the coil windings to function. Magnetic fields can be potentially harmful over time to electronics in the vicinity of the RF signal amplify, e.g., magnetic based storage units like a hard drive of a digital video recorder (DVR).

Resistors are capable of handling a wider bandwidth as compared to a ferrite-based power divider. An expanded bandwidth could translate into additional channels in the downstream signal flow. Also or alternatively, an expanded bandwidth could translate into more data, e.g., customer-based web-site hosting, in the upstream signal flow.

Resistors are surface mounted to a printed circuit board (PCB) as compared to ferrite-based power dividers, which extend well above the surface of the PCB and increase the volume within an enclosure to accommodate the PCB. Also, resistors occupy less surface area on the PCB as compared to ferrite-based power dividers. Reduced surface area requirements and reduced height requirements lead to a reduced overall casing, which again increases the cost savings.

As a disadvantage, ferrite-based power dividers have better channel isolation between the CATV & MoCA® output ports. Channel isolation is desired so that reverse path signals (in the 5-42 MHz frequency band) sent by a first device connected to a first port are mainly sent upstream to the service provider and are significantly diverted away from a second device connected to a second output port. However, the Applicant has discovered that the resistive splitter network is acceptable in channel isolation. In other words, although less isolation is present, the reverse path signals may be accurately sent to the service provider and are attenuated enough to not interfere with other devices connected to other output ports of the RF signal amplifier. A resistive splitter network may also introduce more attenuation between the input 169 to the resistive splitter network and a given output port, as compared to the attenuation across the power divider network 170. However, the Applicant has discovered that the power amplifiers 140 and 142 are sufficient to accommodate the added attenuation, and the upstream and downstream signaling is maintained.

The Applicant has also appreciated that it is common in household installations that not every coaxial outlet in the household needs to be prepared for CATV downstream signal feeds. Rather, many of the coaxial outlets are simply used for MoCA® devices. For example, a typical household might need only one, two, or at most three, coaxial outlets with CATV downstream and upstream signaling abilities. Most houses seem to have one or two of the expensive set top boxes with DVR abilities and a modem for internet communications. Other outlets in the house might only need MoCA® abilities. For example, a TV that is used to watch recorded events from the DVR, a computer that interacts with the modem for internet access, a VoIP phone that interacts with the modem, a gaming station that only interacts with another gaming station at another wall outlet, etc. Therefore, the Applicant has appreciated a new device, which includes plural "MoCA® only" output ports supplied by a second resistive splitter network, separate from the resistive splitter network used on the "CATV & MoCA®" output ports.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
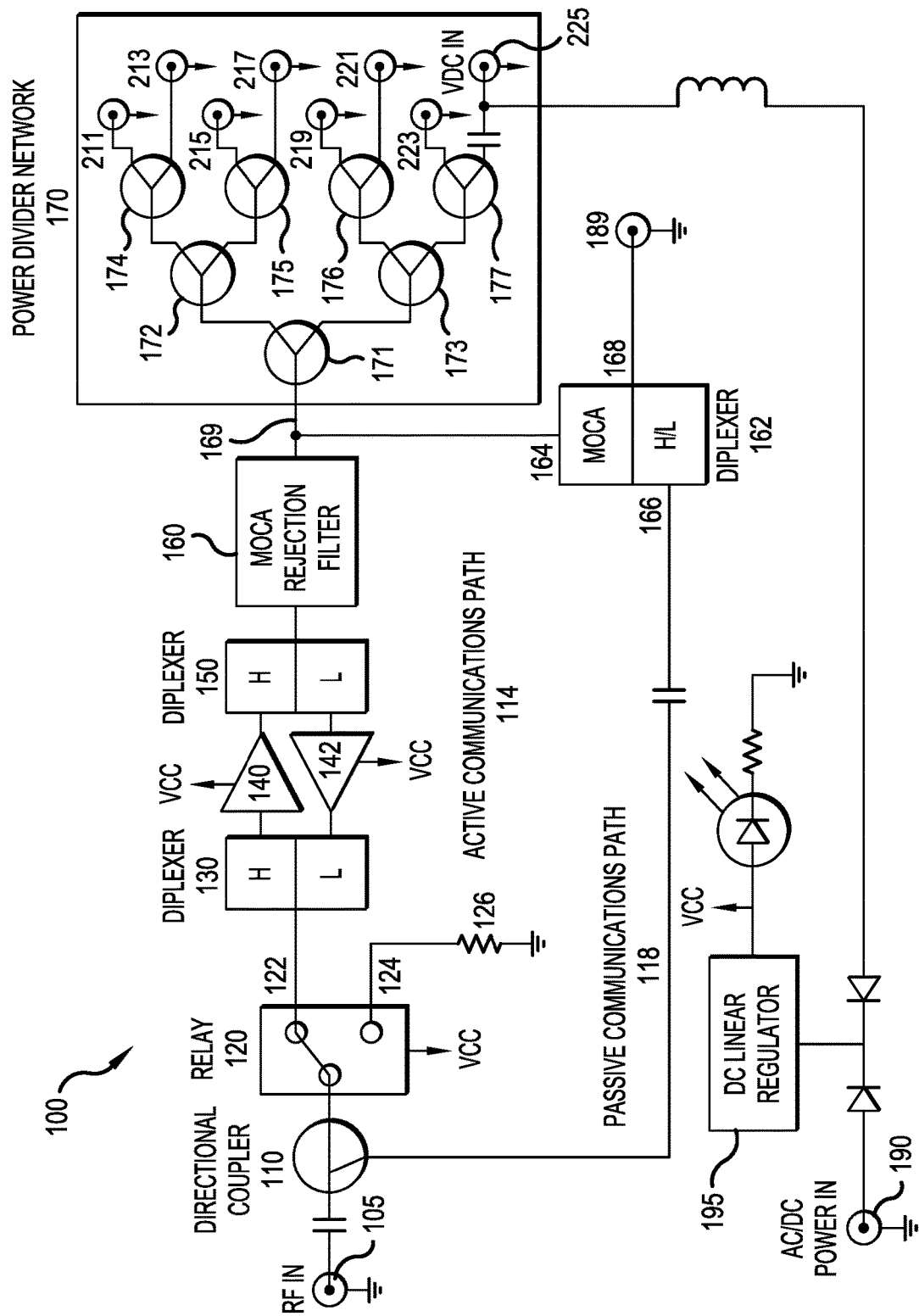
FIG. 1 is a block diagram of a CATV bi-directional RF signal amplifier, according to the background art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
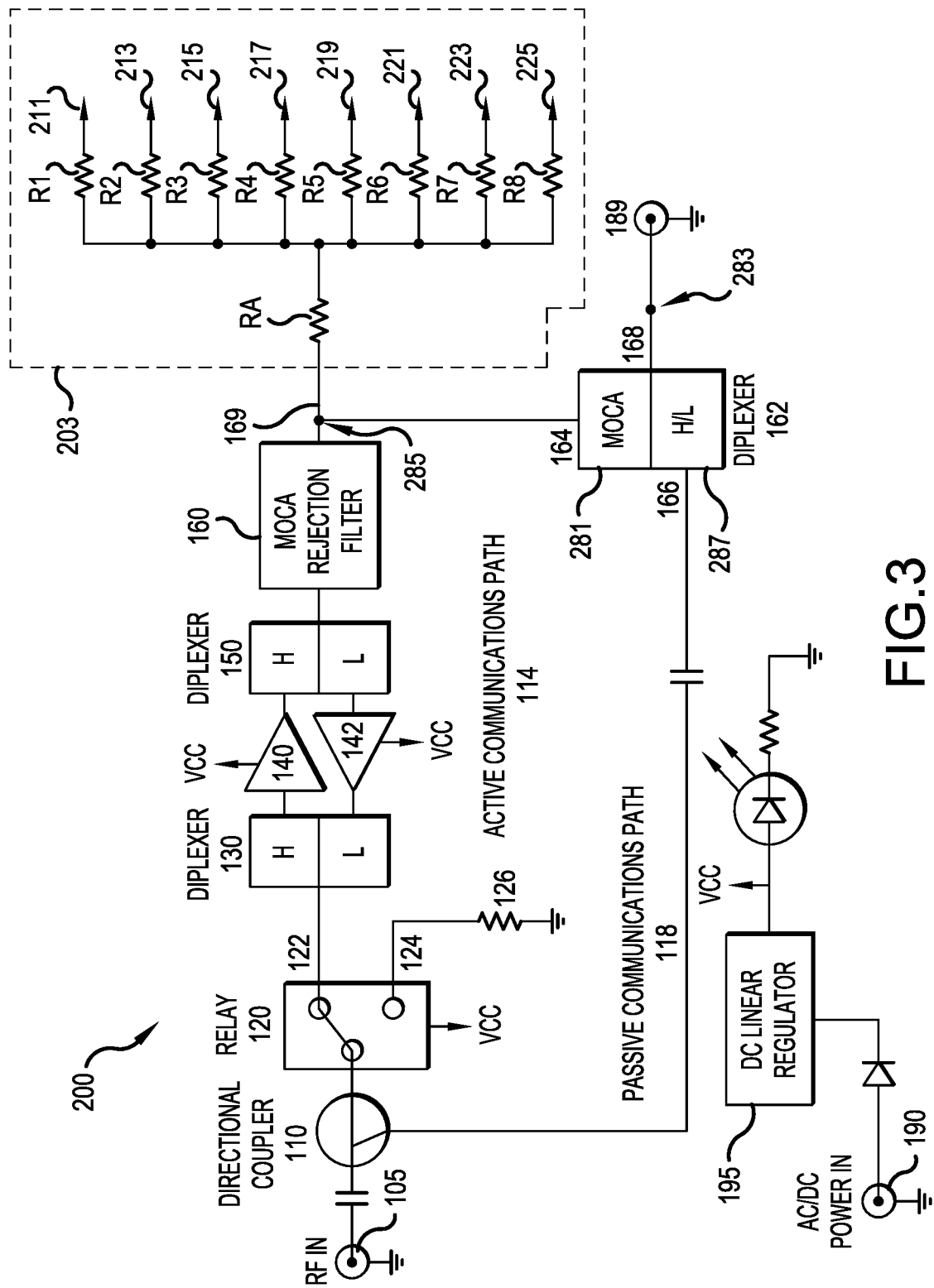
FIG. 3 is a block diagram of a CATV bi-directional RF signal amplifier, according to a first embodiment of the present invention.

FIG. 3 is a block diagram of a CATV bi-directional RF signal amplifier 200, according to a first embodiment of the present invention. The CATV RF amplifier 200 includes many of the same or similar elements, as compared to FIG. 1, and these elements have been labeled by the same reference numerals.

Figure 2:
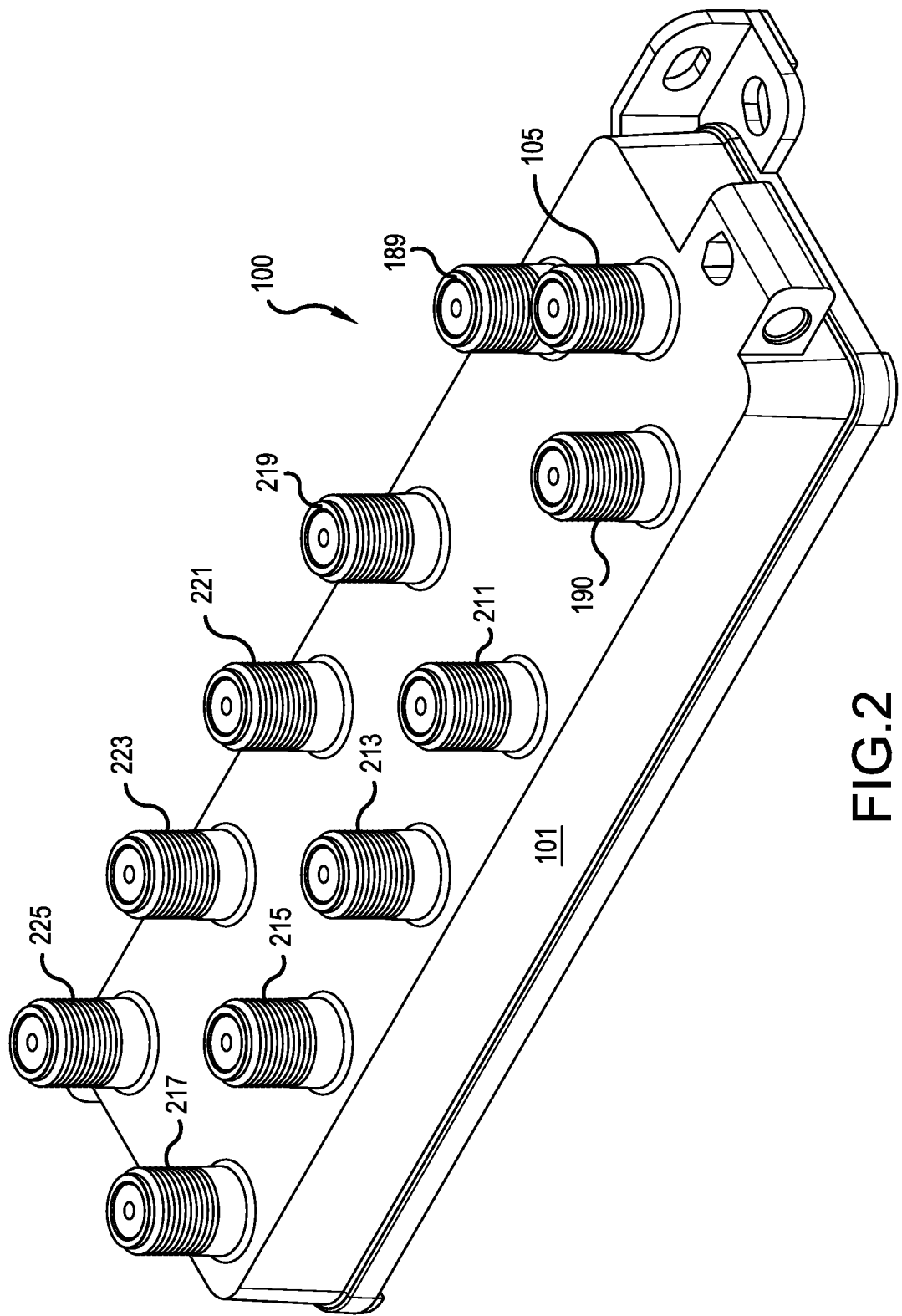
FIG. 2 is a front perspective view of a housing of a bi-directional RF signal amplifier.

The CATV RF amplifier 200 is enclosed by a housing 101. In particular, the housing 101 may be the same as depicted in FIG. 2, although the dimension (length, width and thickness) may be slightly reduced due to the smaller components.

A RF input port 105 is located on the housing 101. The input port 105 receives downstream service provider signals and transmits upstream signals from customer devices to the service provider. As in the background art, the RF amplifier 200 includes a first or upstream diplexer 130 having a full frequency band terminal, a high frequency band terminal and a low frequency band terminal. The full frequency band terminal is connected to the input port 105, via a relay 120 and a first directional coupler 110, which function as described in conjunction with FIG. 1.

A second or downstream diplexer 150 has a full frequency band terminal, a high frequency band terminal and a low frequency band terminal. The full frequency band terminal is connected to the input 169 of a resistive splitter network 203, via first filter 160 functioning as in-home network frequency rejection filter, i.e., a MoCA® rejection filter. The first filter 160 is configured to reflect a majority of the signal energy in the 1125 MHz to 1675 MHz frequency band back downstream toward the input 169 of the resistive splitter network 203, while allowing the upstream and downstream frequency bands of the service provider to pass therethrough freely. The upstream and downstream frequency bands of the service provider may reside within a frequency band of 5 to 1002 MHz, and the MoCA® frequency band may reside within a frequency band of 1125 to 1675 MHz.

A first amplifier 140 has an input connected to the high frequency band terminal of the first diplexer 130 and an output connected to the high frequency band terminal of the second diplexer 150. A second amplifier 142 has an input connected to the low frequency band terminal of the second diplexer 150 and an output connected to the low frequency band terminal of the first diplexer 130.

The resistive splitter network 203 has a plurality of first output ports 211, 213, 215, 217, 219, 221, 223 and 225 located on the housing 101 for outputting service provider signals to customer devices. The first output ports 211, 213, 215, 217, 219, 221, 223 and 225 are also configured for receiving signals directed to the service provider from the customer devices. The first output ports 211, 213, 215, 217, 219, 221, 223 and 225 are also for transmitting and receiving signals associated with an in-home network, allowing customer devices within the home network to communicate with each other. Hence, the first output ports 211, 213, 215, 217, 219, 221, 223 and 225 function as "CATV and in-home network" ports, and may be so marked in an adjacent space on the exterior of the housing 101.

As with the background art, the CATV RF amplifier 200 may include a passive communications path 118 formed within the housing 201. The passive communications path 118 has no powered elements disposed therein. A first end of the passive communications path 118 is connected to the input port 105 via the first directional coupler 110.

A passive RF output port 189 is located on the housing 101. The passive output port 189 is connected to a second end of the passive communications path 118, opposite the first end of said passive communications path 118. In the embodiment of FIG. 3, the passive output port 189 is connected to the second end of the passive communications path 118 via the diplexer 162, as more fully discussed in relation to the background art of FIG. 1.

The diplexer 162 functions basically as MoCA® pass filter 281, which is coupled between a first node 283 and a second node 285. The first node 283 is located upstream of the passive RF output port 189 along the passive communications path 118. The second node 285 is located downstream of the first filter 160 and upstream of the input 169 to the resistive splitter network 203 along the active communications path 114. The MoCA® pass filter 281 is configured to pass signals in a MoCA® frequency band and to not pass signals in the upstream and downstream frequency bands of the service provider.

The H/L portion of the diplexer 162 functions as a second filter 287 coupled along the passive communications path 118 between the RF input port 105 and the first node 283. The second filter 287 is configured to pass signals in upstream and downstream frequency bands of a service provider, while blocking signals in the MoCA® frequency band. Basically, the first filter 160 and the second filter 287 both block signals in at least the 1125 MHz to 1675 MHz frequency band.

Figure 4:
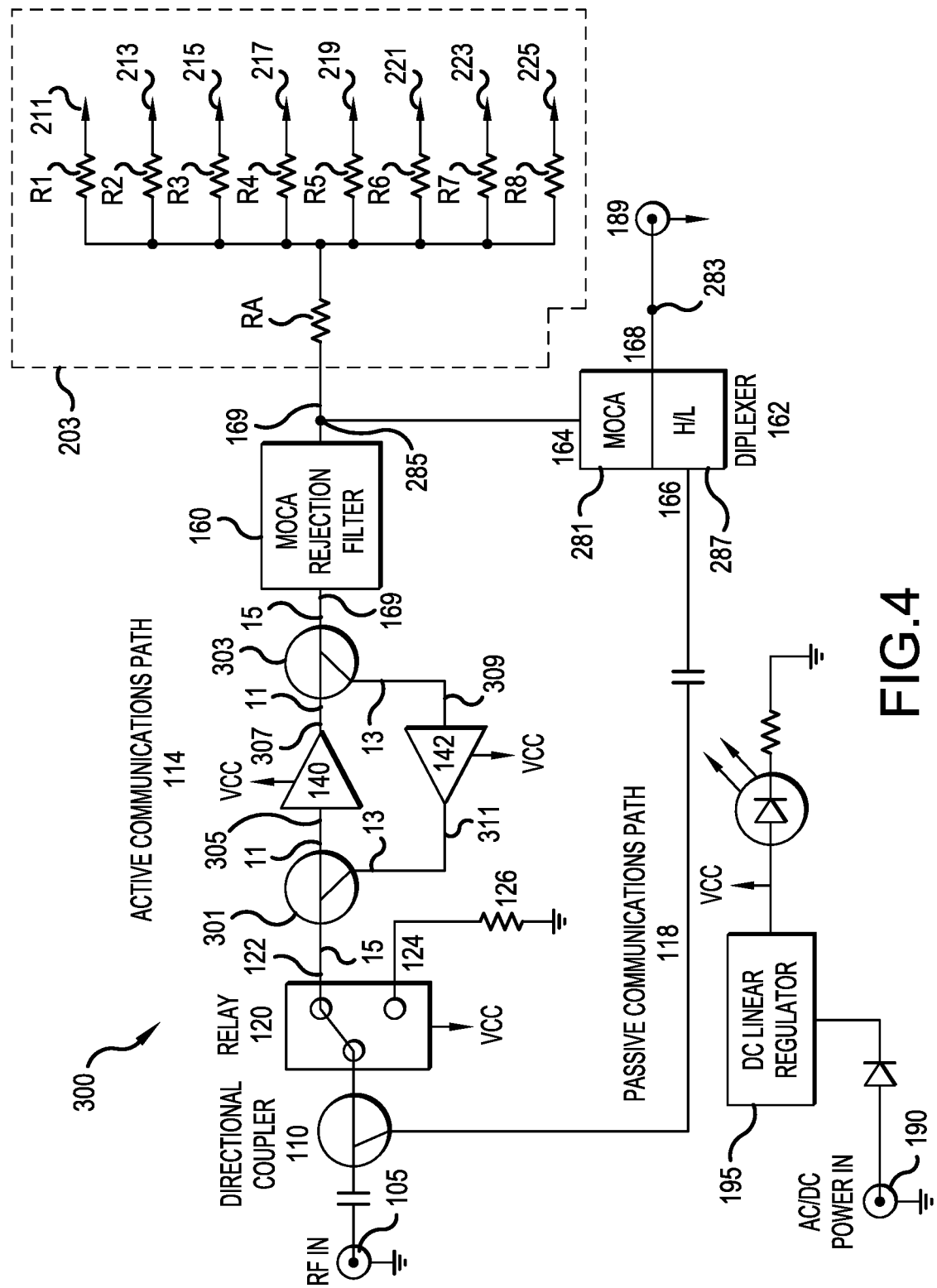
FIG. 4 is a block diagram of a CATV bi-directional RF signal amplifier, according to a second embodiment of the present invention.

FIG. 4 is a block diagram of a CATV bi-directional RF signal amplifier 300, according to a second embodiment of the present invention. The CATV RF amplifier 300 is identical to the CATV RF amplifier 200 of FIG. 3, except that the first and second diplexers 130 and 150 have been replaced by upstream and downstream directional couplers 301 and 303. The upstream and downstream directional couplers 301 and 303 in combination with the first and second amplifiers 140 and 142 form a full duplex amplifier, which will be briefly described below. More details concerning the full duplex amplifier can be found in the Assignee's application Ser. No. 62/740,550, which is herein incorporated by reference.

The full duplex amplifier has an upstream directional coupler 301. The upstream directional coupler 301 has a first terminal 11, a second terminal 13 and a third terminal 15. Signals passing between the first and third terminals 11 and 15 in either direction encounter a first level of attenuation. Signals passing between the second and third terminals 13 and 15 encounter a second level of attenuation greater than the first level of attenuation. Signals passing between the first and second terminals 11 and 13 encounter a third level of attenuation greater than the second level of attenuation.

The first level of attenuation is less than 2 dB, such as between 0.5 to 1.0 dB, like about 0.7 dB. The second level of attenuation is between 3 and 15 dB, such as between 5 and 10 dB, more preferably in the 7 dB to 9 dB range. The third level of attenuation is greater than 25 dB, such as greater than 30 dB, like 40 dB or more.

The full duplex amplifier also has a downstream directional coupler 303, having first, second and third terminals 11, 13 and 15, respectively. The downstream directional coupler 303 may be configured to have the same performance characteristics as the upstream directional coupler 301, regarding the dB losses between the first, second and third terminals 11, 13 and 15.

The first amplifier 140 has an input 305 connected to the first terminal 11 of the upstream directional coupler 301 and an output 307 connected to the first terminal 11 of the downstream directional coupler 303. A second amplifier 142 has an input 309 connected to the second terminal 13 of the downstream directional coupler 303 and an output 311 connected to the second terminal 13 of the upstream directional coupler 301.

In the embodiment of FIG. 4, the input 305 of the first amplifier 140 is directly connected to the first terminal 11 of the upstream directional coupler 301 without any intervening element. The output 307 of the first amplifier 140 is directly connected to the first terminal 11 of the downstream directional coupler 303 without any intervening element. The input 309 of the second amplifier 142 is directly connected to the second terminal 13 of the downstream directional coupler 303 without any intervening element. Also, the output 311 of the second amplifier 142 is directly connected to the second terminal 13 of the upstream directional coupler 301 without any intervening element.

The third terminal 15 of the upstream directional coupler 301 is considered a first input/output of the full duplex amplifier 300. The third terminal 15 of the downstream directional coupler 303 is considered a second input/output of the full duplex amplifier 300. The first input/output of the full duplex amplifier and is connected to said RF input port 105 via the relay 120 and directional coupler 110. The second input/output of the full duplex amplifier and is connected to the input 169 of the resistive splitter network 203 via the MoCA® rejection filter 160.

Figure 5:
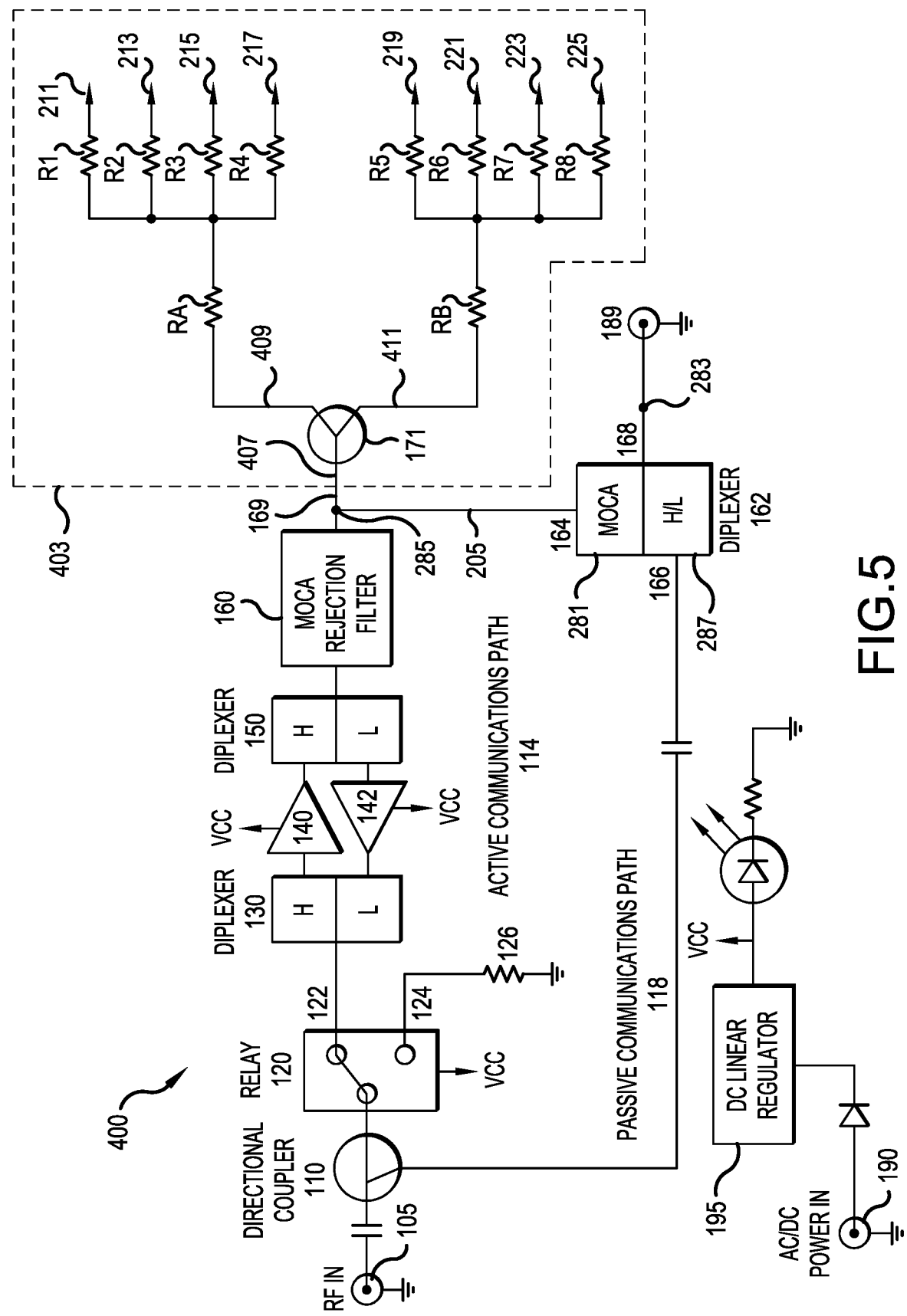
FIG. 5 is a block diagram of a CATV bi-directional RF signal amplifier, according to a third embodiment of the present invention.

In the embodiments of FIGS. 3 and 4, the resistive splitter network 203 includes only resistors. FIG. 5 is a block diagram of a CATV bi-directional RF signal amplifier 400, according to a third embodiment of the present invention. The CATV RF amplifier 400 is identical to the CATV RF amplifier 200 of FIG. 3, except that the resistive splitter network 203 has been replaced with a modified resistive splitter network 403.

The modified resistive splitter network 403 includes a power divider 171 with a ferrite core to split an incoming signal received at an input leg 407 to two output legs 409 and 411. The power divider 171 also uses the ferrite core to combine signals received at the two output legs 409 and 411 to send the combined signal to the input leg 407.

A first plurality of resistors RA, R1, R2, R3 and R4 are connected to the first output leg 409 and are connected to first, second, third and fourth RF output ports 211, 213, 215 and 217. A second plurality of resistors RB, R5, R6, R7 and R8 are connected to the second output leg 411 and are connected to fifth, sixth, seventh and eighth RF output ports 219, 221, 223 and 225. The first through eighth RF output ports function as "CATV & MoCA®" ports and may be so labeled on the outer surface of the housing 101. The power divider 171 provides a high isolation between the first and second plurality of resistors.

In this manner, if a technician experiences a problem wherein two customer devices in the first group of RF output ports 211, 213, 215 and 217 are experiencing errors due to poor channel isolation, e.g., one device as a high signal output strength which cannot be attenuated and/or a second device is particularly susceptible to signals from another device, also connected to one of the RF output ports 211, 213, 215 and 217, the two devices may be separated. By placing the devices into the modified resistive splitter network 403 on opposite sides of the power divider 171, good signal isolation is achieved. In other words, connect the first device to one of the first, second, third or fourth RF output ports 211, 213, 215 or 217, and connect the second device to one of the fifth, sixth, seventh or eighth RF output ports 219, 221, 223 or 225 to improve signal isolation between the first and second devices. The third embodiment of FIG. 5, while including a single power divider 171, still offers some of the general benefits of the present invention, such as lower costs and more consistent performance, within a small space.

Figure 6:
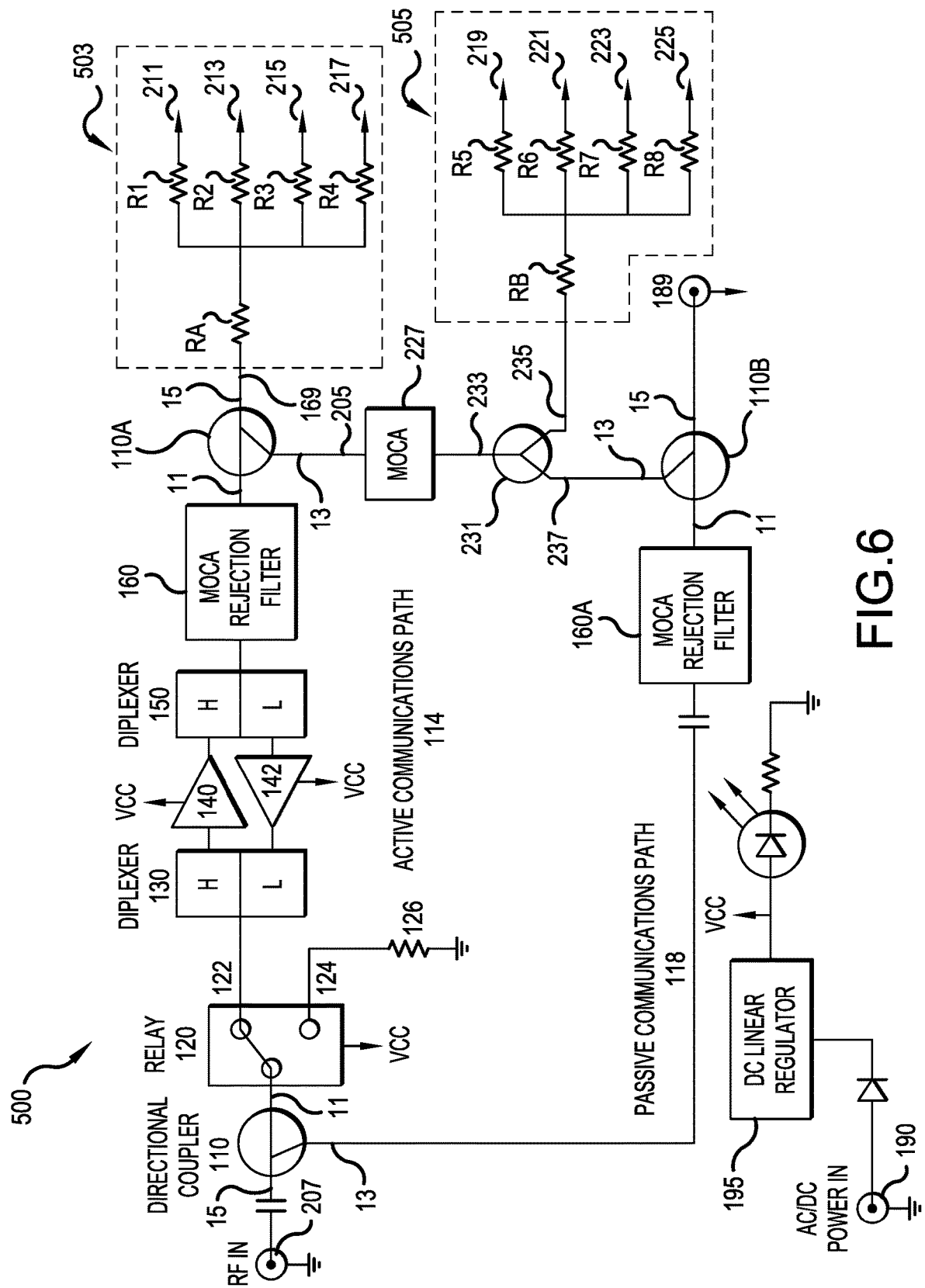
FIG. 6 is a block diagram of a CATV bi-directional RF signal amplifier, according to a fourth embodiment of the present invention.

FIG. 6 is a block diagram of a CATV bi-directional RF signal amplifier 500, according to a fourth embodiment of the present invention. The CATV RF amplifier 500 is similar to the CATV RF amplifier 200 of FIG. 3, but includes several new features. Output ports 211, 213, 215 and 217 have been grouped separately into a first resistive splitter network 503 and are considered a plurality of first output ports. Output ports 219, 221, 223 and 225 are grouped separately in a second resistive splitter network 505 and are considered a plurality of second output ports.

The plurality of second output ports 219, 221, 223 and 225 is also located on the housing 201, and can be configured as shown in FIG. 2. The second output ports 219, 221, 223 and 225 are for transmitting and receiving in-home network signals only—hence, allowing customer devices within the home network to communicate with each other. The second output ports 219, 221, 223 and 225 do not output service provider signals to customer devices and do not pass customer device signals to the service provider. The second output ports 219, 221, 223 and 225 function as "in-home network only" ports, and may be so marked in an adjacent space on the exterior of the housing 101 as "MoCA® only." The first plurality of ports 211, 213, 215 and 217 may be labeled as "CATV & MoCA®" ports on the housing 101.

An electrical path 205 exists between the input 169 of the first resistive splitter network 503 and the plurality of second output ports 219, 221, 223 and 225 of the second resistive splitter network 505. A filtering device 227 is disposed along the electrical path 205 to limit signals traversing along the electrical path 205 to in-home network frequencies. As in the background art, the in-home network frequencies may reside within a MoCA® frequency band of 1125 to 1675 MHz, making the filtering device 227, a MoCA® pass filter. The MoCA® pass filter may pass frequencies above 1125 MHz and attenuate frequencies below 1125 MHz. However, in a preferred embodiment, the MoCA® pass filter also attenuates frequencies above 1675 MHz.

FIG. 6 also illustrates an alternative connection scheme between the passive communications path 118 and the active communications path 114. Instead of the second node 169, there now exists a second directional coupler 110A. Also, the passive output port 189 is connected to the second end of the passive communications path 118 via a third directional coupler 110B and a MoCA® rejection filter 160A, which may be configured the same as the MoCA® rejection filter 160, as discussed in relation to the background art of FIG. 1.

The first, second and third directional couplers 110, 110A and 110B may each be configured the same. Namely, each of the first, second and third directional couplers 110, 110A and 110B has first, second and third terminals 11, 13, and 15, respectively. Signals passing between the first and third terminals 11 and 15 in either direction encounter a first level of attenuation. Signals passing between the second and third terminals 13 and 15 encounter a second level of attenuation greater than the first level of attenuation. Signals passing between the first and second terminals 11 and 13 encounter a third level of attenuation greater than the second level of attenuation.

The first level of attenuation is less than 2 dB, such as between 0.5 to 1.0 dB, like about 0.7 dB. The second level of attenuation is between 3 and 15 dB, such as between 5 and 10 dB, more particularly in the 7 dB to 9 dB range. The third level of attenuation is greater than 25 dB, such as greater than 30 dB, like 40 dB or more.

In the embodiment of FIG. 6, the first terminal 11 of the second directional coupler 110A is directly connected to the MoCA® rejection filter 160 with no intervening elements. The third terminal 15 of the second directional coupler 110A is directly connected to the input 169 of the first resistive splitter network 503 with no intervening elements. The second terminal 13 of the second directional coupler 110A is directly connected to a first end of the electrical path 205.

In the embodiment of FIG. 6, a power divider 231 is part of the electrical path 205. An input 233 of the power divider 231 is connected to a second terminal of a MoCA® pass filter 227. A first terminal of the MoCA® pass filter 227 is directly connected to the second terminal 13 of the second directional coupler 110A. A first output leg 235 of the power divider 231 is directly connected to an input of the second resistive splitter network 505.

The second output leg 237 of the power divider 231 is directly connected to a second terminal 13 of the third directional coupler 110B. A third terminal 15 of the third directional coupler 110B is directly connected to the passive output port 189 without any intervening element. A first terminal 11 of the third directional coupler 110B is directly connected to a first terminal of the MoCA® rejection filter 160A.

As for the resistance values of the resistors in the embodiments of FIGS. 3-4, the value of RA is preferable less than 75 ohm. Also, the resistor RA may be omitted. The resistive splitter network 203 includes eight resistors R1, R2, R3, R4, R5, R6, R7 and R8. A first terminal of each of the resistors R1, R2, R3, R4, R5, R6, R7 and R8 is directly connected to each other. A second terminal of each of the resistors R1, R2, R3, R4, R5, R6, R7 and R8 is directly connected to the plurality of output ports 211, 213, 215, 217, 219, 221, 223 and 225, respectively. The resistive splitter network 203 may include more or fewer resistors to provide for more or fewer output ports, respectively.

The resistive values of the resistors R1, R2, R3, R4, R5, R6, R7 and R8 are selected to produce a port resistance of 75 ohm. Hence, the resistance of each resistor R1, R2, R3, R4, R5, R6, R7 and R8 is less than 75 ohms, typically in the range of 40 to 65 ohms, more particularly in the range of 45 to 60 ohms. Examples of a common resistor value for R1, R2, R3, R4, R5, R6, R7 and R8, which balanced the resistive splitter network 203 are 47 ohms, 53.5 ohm and 60 ohms, depending upon design parameters within the circuit, like the resistor value RA, the number of ports in the resistive splitter network 203, etc.

As for the resistance values of the resistors in the embodiments of FIGS. 5-6, the resistors RA and RB may be used to balance the circuit. The value of each resistor RA or RB would be less than 75 ohms, typically less than 50 ohm, more preferably less than 10 ohms. Also, one or both of the resistance values of resistors RA and RB may be zero, essentially indicating the absence of dedicated resistors in the circuitry.

First terminals of each of the resistors R1, R2, R3 and R4 are directly connected to each other. A second terminal of each of the resistors R1, R2, R3 and R4 is directly connected to the output ports 211, 213, 215 and 217, respectively. The resistive values of the resistors R1, R2, R3 and R4 are selected to produce a port resistance of 75 ohm. Hence, the resistance of each resistor R1, R2, R3 and R4 is less than 75 ohms, typically in the range of 40 to 65 ohms, more particularly in the range of 45 to 60 ohms.

First terminals of each of the resistors R5, R6, R7 and R8 are directly connected to each other. A second terminal of each of the resistors R5, R6, R7 and R8 is directly connected to the output ports 219, 221, 223 and 225, respectively. The resistive values of the resistors R5, R6, R7 and R8 are selected to produce a port resistance of 75 ohm. Hence, the resistance of each resistor R5, R6, R7 and R8 is less than 75 ohms, typically in the range of 40 to 65 ohms, more particularly in the range of 45 to 60 ohms. Examples of resistor values which have balanced the first and second resistive splitter networks 403, 503 and 505 were 47 ohms, 53.5 ohm and 60 ohms, depending upon other design parameters within the circuit, like the resistor values of RA and RB, the number of ports in the first and second resistive splitter network 403, 503 and 505, etc.

Figure 7:
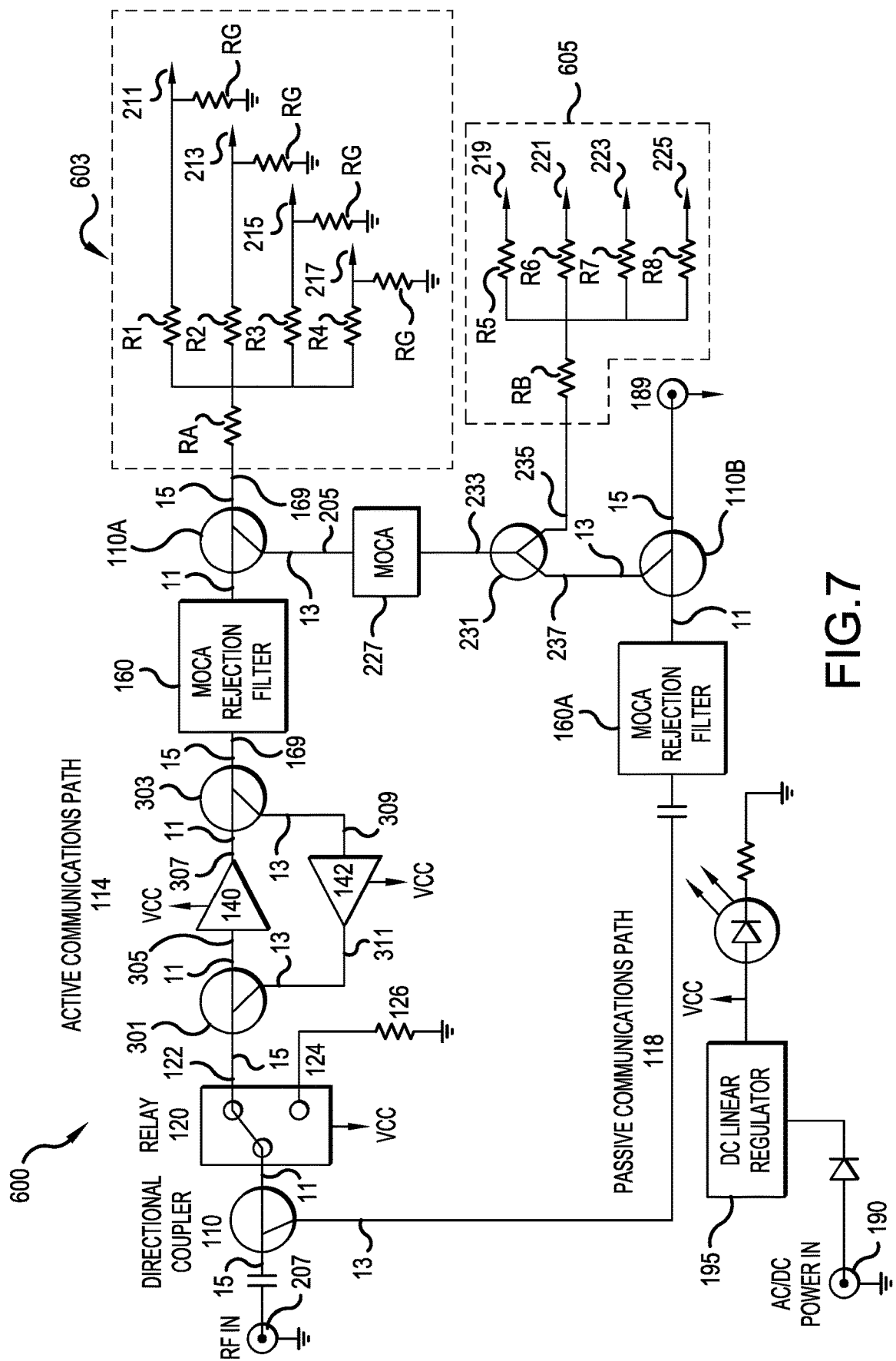
FIG. 7 is a block diagram of a CATV bi-directional RF signal amplifier, according to a fifth embodiment of the present invention.
Figure 8:
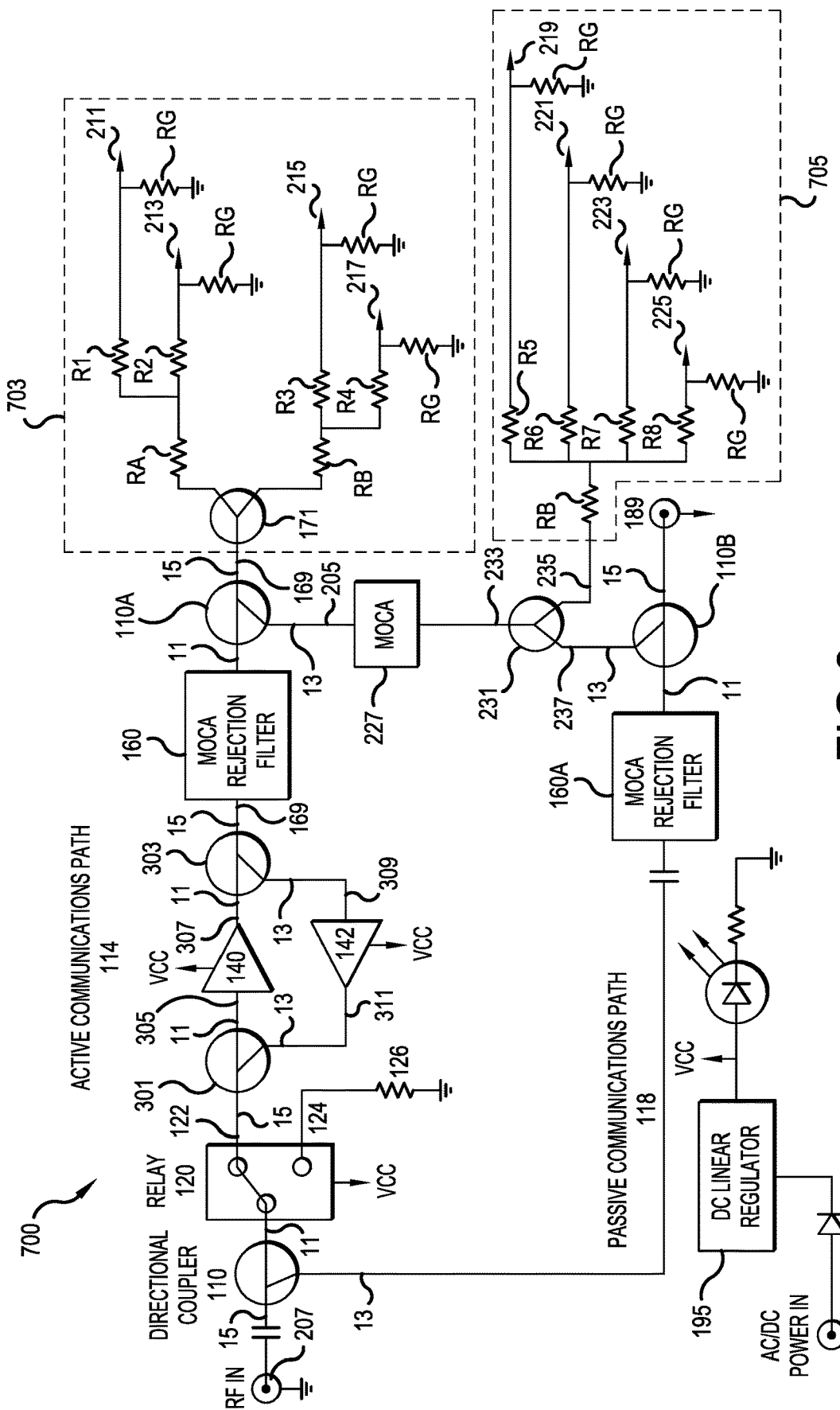
FIG. 8 is a block diagram of a CATV bi-directional RF signal amplifier, according to a sixth embodiment of the present invention.

FIGS. 7 and 8 show block diagrams of a CATV bi-directional RF signal amplifier 600 and 700, according to a fifth embodiment and a sixth embodiment of the present invention, respectively. The fifth embodiment of FIG. 7 is identical to the fourth embodiment of FIG. 6 except for the addition of grounding resistors RG in the first resistive splitter network 603. The seventh embodiment of FIG. 8 is identical to the sixth embodiment of FIG. 7 except for the addition of the grounding resistors RG in the first and second resistive splitter networks 703 and 705, and the additional of a power divider 171 within the first resistive splitter network 703, as described in conjunction with FIG. 5, above.

The grounding resistors RG are optionally included as part of the first and second resistive splitter networks 603, 703, and 705 to balance the first and second resistive splitter networks 603, 703, and 705 in combination with the other circuitry, such as in the instance where no connectors are mated to one or more of the plurality of output ports 211, 213, 215, 217, 219, 221, 223 and 225. In one embodiment, the grounding resistor RG may be 75 ohms or alternatively configured to match the same value as the resistors R1, R2, R3, R4, R5, R6, R7 and R8.

Although the Figures herein have depicted devices with a certain number of ports. The port counts may be increased or decreased. For example, the first and/or second resistive splitter networks 203, 403, 503, 505, 603, 605, 703 and/or 705 may supply more or fewer than four or eight output ports each, such as three ports, five ports or six ports each.

The housing 101 may be formed of brass or any other conductive material. In a preferred embodiment, the housing 101 is formed of zinc or a zinc alloy. Although not illustrated, the housing 101 may include color coded labels to assist in identifying the ports. The female coaxial ports described herein, each have a dielectric insert surrounding a pin receiving portion. The dielectric inserts may have color shading to assist in identifying the ports.

The power divider 171 of FIGS. 5 and 8 may be constructed in accordance with the Assignee's prior U.S. Pat. No. 8,397,271, which is herein incorporated by reference. Optionally, the power divider 171 may have a MoCA® bypass filter, which assists in passing MoCA® signals between the first and second output legs of the power divider 171, as shown in FIGS. 2 and 3 of U.S. Pat. No. 8,397,271. Further, the power divider 171 may be configured to divide an input signal 50-50 between the first and second output legs, or alternatively to divide the input signal by other ratios, like 60-40 or 70-30, to pass most of the input signal to a preferred output leg, e.g., the first output leg.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A CATV radio frequency ("RF") signal amplifier comprising:
a housing;
an input port located on said housing, said input port for receiving downstream service provider signals and for transmitting upstream signals from customer devices to the service provider;
a splitter network having an input;
a plurality of first output ports located on said housing and configured as outputs of said splitter network, said plurality of first output ports for outputting service provider signals to customer devices and for receiving signals directed to the service provider, and said plurality of first output ports also for transmitting and receiving signals associated with an in-home network, allowing customer devices within the home network to communicate with each other, said plurality of first output ports functioning as "CATV and in-home network" ports; and
a full duplex amplifier including:
an upstream directional coupler having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation;
a downstream directional coupler having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation;
a first amplifier having an input connected to one of said first terminal or said second terminal of said upstream directional coupler and an output connected to one of said first terminal or said second terminal of said downstream directional coupler; and
a second amplifier having an input connected to the other of said first terminal or said second terminal of said downstream directional coupler and an output connected to the other of said first terminal or said second terminal of said upstream directional coupler, wherein said third terminal of said upstream directional coupler is considered a first input/output of said full duplex amplifier and is connected to said input port, and wherein said third terminal of said downstream directional coupler is considered a second input/output of said full duplex amplifier and is connected to said input of said splitter network.

2. The RF signal amplifier of claim 1, further comprising:
a first filter functioning as an in-home network rejection filter and coupled between said input of said splitter network and said RF input port.

3. The RF signal amplifier of claim 2, wherein said first filter is located in the connection between said second input/output of said full duplex amplifier and said input of said splitter network.

4. The RF signal amplifier of claim 1, further comprising:
a plurality of second output ports located on said housing, said plurality of second output ports for transmitting and receiving in-home network signals allowing customer devices within the home network to communicate with each other, wherein said plurality of second output ports do not output service provider signals to customer devices and do not pass customer device signals to the service provider, said plurality of second output ports functioning as "in-home network only" ports;
an electrical path between said input of said splitter network and said plurality of second output ports; and
a filtering device disposed along said electrical path to limit signals traversing along said electrical path to in-home network frequencies.

5. The RF signal amplifier of claim 1, wherein said splitter network includes only resistors.

6. The RF signal amplifier of claim 1, wherein said splitter network includes a power divider with a ferrite core to split an incoming signal at an input leg to two output legs, and wherein said ferrite core functions to combine signals received at said two output legs and send the combined signal to said input leg.

7. The RF signal amplifier of claim 6, further comprising: a first plurality of resistors connected to said first output leg and connected to first and second RF output ports of said plurality of first output ports, and a second plurality of resistors connected to said second output leg and connected to third and fourth RF output ports of said plurality of first output ports.

8. The RF signal amplifier of claim 1, wherein signal paths passing through said first and second amplifiers are considered an active communications path, and further comprising:
a passive communications path formed within said housing, wherein said passive communications path has no powered elements disposed therein, and wherein a first end of said passive communications path is connected to said input port; and
a passive output port located on said housing, which is connected to a second end of said passive communications path, opposite said first end of said passive communications path.

9. The RF signal amplifier of claim 8, further comprising: a first directional coupler, having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal of said first directional coupler is connected to said first input/output of said full duplex amplifier, said second terminal of said first directional coupler is connected to said first end of said passive communication path, and said third terminal of said first directional coupler is connected to said input port.

10. The RF signal amplifier of claim 9, further comprising:
a relay having a first terminal directly connected to said first terminal of said first directional coupler, a second terminal directly connected to said first input/output of said full duplex amplifier, and a third terminal directly connected to a grounded impedance, wherein said relay connects said first terminal to said second terminal when power is being provided to said first and second amplifiers, and said relay connects said first terminal to said third terminal when power is not being provided to said first and second amplifiers.

11. The RF signal amplifier of claim 8, further comprising:
an electrical path between said input of said splitter network and said passive output port; and
a filtering device disposed along said electrical path to limit signals traversing along said electrical path to in-home network frequencies.

12. A CATV radio frequency ("RF") signal amplifier comprising:
a RF input port;
a resistive splitter network having an input and a plurality of active RF output ports;
an active communications path connecting said RF input port to said input of said resistive splitter network, said active communications path including at least one power amplifier to amplify an upstream signal or a downstream signal passing along said active communications path;
a first filter functioning as an in-home network rejection filter and coupled between said input of said resistive splitter network and said RF input port;
a passive RF output port;
a passive communications path connecting said RF input port to said passive RF output port; and
an in-home network pass filter coupled between a first node and a second node, wherein said first node is located upstream of said passive RF output port along said passive communications path and said second node is located downstream of said first filter and upstream of at least one of said plurality of active RF output ports along said active communications path, said in-home network pass filter configured to pass signals in an in-home network frequency band and to not pass signals in upstream and downstream frequency bands of a service provider.

13. The RF signal amplifier of claim 12, further comprising:
a first directional coupler, having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal of said first directional coupler is connected to said active communications path, said second terminal of said first directional coupler is connected to said passive communication path, and said third terminal of said first directional coupler is connected to said input port.

14. The RF signal amplifier of claim 13, further comprising:
a relay having a first terminal directly connected to said first terminal of said first directional coupler, a second terminal directly connected to said active communications path, and a third terminal directly connected to a grounded impedance, wherein said relay connects said first terminal to said second terminal when power is being provided to said at least one power amplifier, and said relay connects said first terminal to said third terminal when power is not being provided to said at least one power amplifier.

15. The RF signal amplifier of claim 12, further comprising:
a housing;
wherein said RF input port is located on said housing, said RF input port for receiving downstream service provider signals and for transmitting upstream signals from customer devices to the service provider;
wherein said plurality of active RF output ports are first output ports located on said housing and configured as outputs of said resistive splitter network, said plurality of first output ports for outputting service provider signals to customer devices and for receiving signals directed to the service provider, and said plurality of first output ports also for transmitting and receiving signals associated with an in-home network, allowing customer devices within the home network to communicate with each other, said plurality of first output ports functioning as "CATV and in-home network" ports;

wherein said active communications path includes:
a first diplexer having a full frequency band terminal, a high frequency band terminal and a low frequency band terminal, wherein said full frequency band terminal is connected to said RF input port;
a second diplexer having a full frequency band terminal, a high frequency band terminal and a low frequency band terminal, wherein said full frequency band terminal is connected to said input of said resistive splitter network; and
wherein said at least one power amplifier includes a first amplifier having an input connected to said high frequency band terminal of said first diplexer and an output connected to said high frequency band terminal of said second diplexer.

16. The RF signal amplifier of claim 15, wherein said at least one power amplifier further includes a second amplifier having an input connected to said low frequency band terminal of said second diplexer and an output connected to said low frequency band terminal of said first diplexer.

17. The RF signal amplifier of claim 15, further comprising:
a plurality of second output ports located on said housing, said plurality of second output ports for transmitting and receiving in-home network signals allowing customer devices within the home network to communicate with each other, wherein said plurality of second output ports do not output service provider signals to customer devices and do not pass customer device signals to the service provider, said plurality of second output ports functioning as "in-home network only" ports;
an electrical path between said input of said resistive splitter network and said plurality of second output ports; and
wherein said in-home network pass filter is disposed along said electrical path to limit signals traversing along said electrical path to in-home network frequencies.

18. The RF signal amplifier of claim 15, further comprising:
a first directional coupler, having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal of said first directional coupler is connected to said active communications path, said second terminal of said first directional coupler is connected to said passive communication path, and said third terminal of said first directional coupler is connected to said RF input port.

19. A CATV radio frequency ("RF") signal amplifier comprising:
a housing;
an input port located on said housing, said input port for receiving downstream service provider signals and for transmitting upstream signals from customer devices to the service provider;
a resistive splitter network having an input;
a plurality of first output ports located on said housing and configured as outputs of said resistive splitter network, said plurality of first output ports for outputting service provider signals to customer devices and for receiving signals directed to the service provider, and said plurality of first output ports also for transmitting and receiving signals associated with an in-home network, allowing customer devices within the home network to communicate with each other, said plurality of first output ports functioning as "CATV and in-home network" ports;
a first diplexer having a full frequency band terminal, a high frequency band terminal and a low frequency band terminal, wherein said full frequency band terminal is connected to said input port;
a second diplexer having a full frequency band terminal, a high frequency band terminal and a low frequency band terminal, wherein said full frequency band terminal is connected to said input of said resistive splitter network;
a first amplifier having an input connected to said high frequency band terminal of said first diplexer and an output connected to said high frequency band terminal of said second diplexer, wherein signal paths passing through said first and second diplexers are considered an active communications path;
a passive communications path formed within said housing, wherein said passive communications path has no powered elements disposed therein, and wherein a first end of said passive communications path is connected to said input port;
a passive output port located on said housing, which is connected to a second end of said passive communications path, opposite said first end of said passive communications path;
an electrical path between said input of said resistive splitter network and said passive output port;
a filtering device disposed along said electrical path to limit signals traversing along said electrical path to in-home network frequencies; and
a first directional coupler, having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal of said first directional coupler is connected to said active communications path, said second terminal of said first directional coupler is connected to said passive communication path, and said third terminal of said first directional coupler is connected to said input port.

20. The RF signal amplifier of claim 19, further comprising:
a relay having a first terminal directly connected to said first terminal of said first directional coupler, a second terminal directly connected to said active communications path, and a third terminal directly connected to a grounded impedance, wherein said relay connects said first terminal to said second terminal when power is being provided to said at least one power amplifier, and said relay connects said first terminal to said third terminal when power is not being provided to said at least one power amplifier.

* * * * *